United States Patent [19]

Carr et al.

[11] Patent Number: 4,804,018
[45] Date of Patent: Feb. 14, 1989

[54] GROUTED CLOSURE ASSEMBLY

[75] Inventors: Thomas N. Carr, New Orleans; David M. Crimmins, Metairie, both of La.

[73] Assignee: McDermott International, Inc., New Orleans, La.

[21] Appl. No.: 114,915

[22] Filed: Oct. 30, 1987

[51] Int. Cl.4 .................. F16L 55/10; E02D 23/02
[52] U.S. Cl. ........................ 138/93; 138/89; 138/97; 405/205; 405/232
[58] Field of Search ............... 138/89, 90, 93, 97, 138/98; 405/232, 206, 203, 205, 150; 166/188, 192, 133, 135, 373

[56] References Cited

U.S. PATENT DOCUMENTS

| 2,444,149 | 6/1948 | Aldridge | 138/89 X |
| 2,583,316 | 1/1952 | Bannister | 138/97 X |
| 2,908,248 | 10/1959 | Bront | 138/97 X |
| 3,103,235 | 9/1963 | Stronghomn | 138/93 X |
| 3,106,735 | 10/1963 | Landrum et al. | 138/97 X |
| 3,267,967 | 8/1966 | Guthrie | 138/97 |
| 3,269,421 | 8/1966 | Telford et al. | 138/97 |
| 3,483,895 | 12/1969 | Barto | 138/97 |
| 3,496,588 | 2/1970 | ver Nooy | 138/89 X |
| 3,568,721 | 3/1971 | Ross et al. | 138/97 |
| 3,762,446 | 10/1973 | Tungseth et al. | 138/97 |
| 4,044,798 | 8/1977 | Feldstein et al. | 138/89 X |
| 4,114,654 | 9/1978 | Richardson | 138/97 X |

Primary Examiner—James E. Bryant, III
Attorney, Agent, or Firm—Robert J. Edwards; Michael L. Hoelter

[57] ABSTRACT

A closure assembly is lowered into the leg of an offshore jacket. Its alignment within the jacket is maintained by a series of centralizers on its outer periphery surface. A grout packer surrounding the closure assembly seals between this assembly and the inside surface of the jacket. Afterwhich grout, or some other sealant, is pumped into the annulus above the grout packer, when cured, rigidly forms a plug within the jacket leg.

5 Claims, 3 Drawing Sheets

GROUTED CLOSURE ASSEMBLY

FIELD OF THE INVENTION

This invention pertains to the sealing or plugging of hollow cylindrical members, such as the legs of an offshore jacket, and more particularly to a sealing member positioned within the cylinder which utilizes grout to seal between it and the inside surface of the cylinder.

BACKGROUND OF THE INVENTION

In shallow water of 100 feet or less, marine structures such as offshore jackets are typically salvaged by a derrick barge which lifts and places the jacket upon a towing vessel. At greater depths, however, the offshore jacket must be refloated in either a vertical or a horizontal position before it can be salvaged. After refloating, the cumbersome structure is then either towed in the water or positioned on a barge and towed to some other location.

One method of refloating the jacket is to attach bouyancy tanks or bags to it. Unfortunately, this is a costly procedure since deploying and securing this equipment entails extensive offshore salvage and diving time.

Fortunately, most jackets can be refloated without requiring supplemental bouyancy equipment provided the jacket legs can be sealed off and deballasted. Generally, when the jacket was initially installed, the legs were equipped with top and bottom closure plates that sealed the legs for floatation purposes. To sink the structure, the closure plates were removed. Now that the jacket is to be refloated, the legs must be resealed and deballasted. Installing the top closure plate is a relatively easy matter, but the same cannot be said for the bottom closure plate or for deballasting the leg once the bottom of the leg is plugged.

There currently exist several concepts for sealing the lower region of a jacket leg. One concept employs an inflatable air bladder that fits within the jacket leg, but care must be taken not to rip or tear it, nor does the bladder provide a means for easily deballasting the leg.

A second concept, illustrated in U.S. Pat. Nos. 3,751,932, 4,215,951, 4,262,702, and 4,549,580, employs a generally cylindrical insert having an outer circumferential ring of a rubber-like material. The insert is lowered to the desired elevation afterwhich the rubber ring is biased against the inside surface of the leg. Such an insert is quite intricate (i.e. costly) and should the sealing force ever be reduced or come undone, the seal would be broken. Such an insert is also not very well suited for sealing against uneven surfaces.

Another concept is illustrated in U.S. Pat. Nos. 3,908,682, 4,262,702, and 4,518,015. This concept is similar to the preceding one except that it employs annular inflatable bladders to seal against the inside surface of the cylinder. Such bladders are inherently better at sealing against uneven surfaces but care must be taken to avoid ripping or puncturing them. Also, unless the air pressure within these bladders remains relatively constant, the changing hydrostatic pressure can rupture them. Thus the need for an air supply umbilical cord secured to the apparatus, even after refloating, entailing much additional equipment and increasing the overall cost of the plug.

It is thus an object of this invention to provide a sealing plug that is reliable, adaptable to various jacket leg diameters, able to seal against uneven surfaces, and positionable anywhere along the length of the cylinder to be plugged. It is also an object of this invention to provide a sealing plug that can be installed from the top of the jacket leg with a minimum of peripheral equipment and with no diving operation required. A further object is to provide a plug that can resist hydrostatic pressure from one side while the structure is being refloated. Another object is to provide a means for deballasting the jacket leg and for relieving any pressure build-up within the leg.

SUMMARY OF THE INVENTION

This invention comprises a grouted closure assembly having a main body that is insertable within the leg of an offshore jacket. The main body is cylindrical in shape having one end open while the other end is sealed. A mechanism for releasing any pressure which may build-up within the leg is secured to the sealed end of the main body. A series of centralizers are secured to the periphery of the main body which guide and align the closure assembly during its descent within the jacket leg. Adjacent to the sealed end is at least one grout packer that extends around the circumference of the main body. This grout packer seals against the inside surface of the jacket leg and defines the lower boundary of the annulus between the main body and the jacket leg. Grout, or some other sealant, is forced into this annulus displacing the water therein and sealing between the main body and the jacket leg. When hardened, this grouted closure assembly forms a water tight seal or plug in addition to having the ability to release any pressure built up in the now sealed portion of the leg.

DETAILED DESCRIPTION OF THE DRAWINGS

Figure 1:
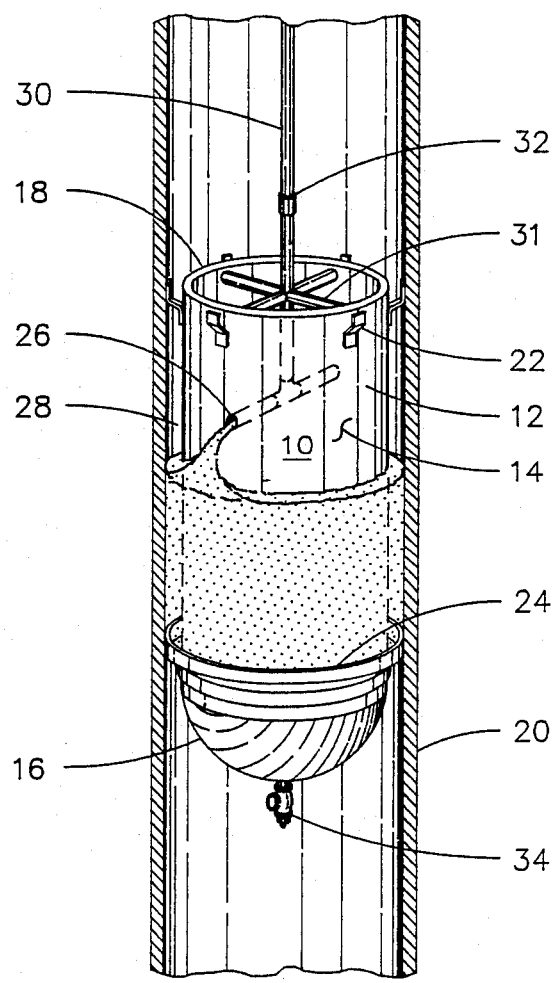
FIG. 1 is a pictorial view, partly broken away, showing the preferred embodiment of the invention.

Referring to the drawings, there is shown grouted closure assembly 10 having main body 12 consisting of hollow cylinder 14. End 16 of cylinder 14, which is shown rounded, is sealed while opposite end 18 of cylinder 14 is open. Main body 12 is inserted within leg 20 of an offshore jacket and lowered until cylinder 14 reaches the desired elevation.

A series of centralizers 22 secured at various locations around the outer circumference of cylinder 14 properly align and guide main body 12 within jacket leg 20. Generally, centralizers 22 are deformable so as to accommodate variations in the inside diameter of jacket leg 20.

Figure 2:
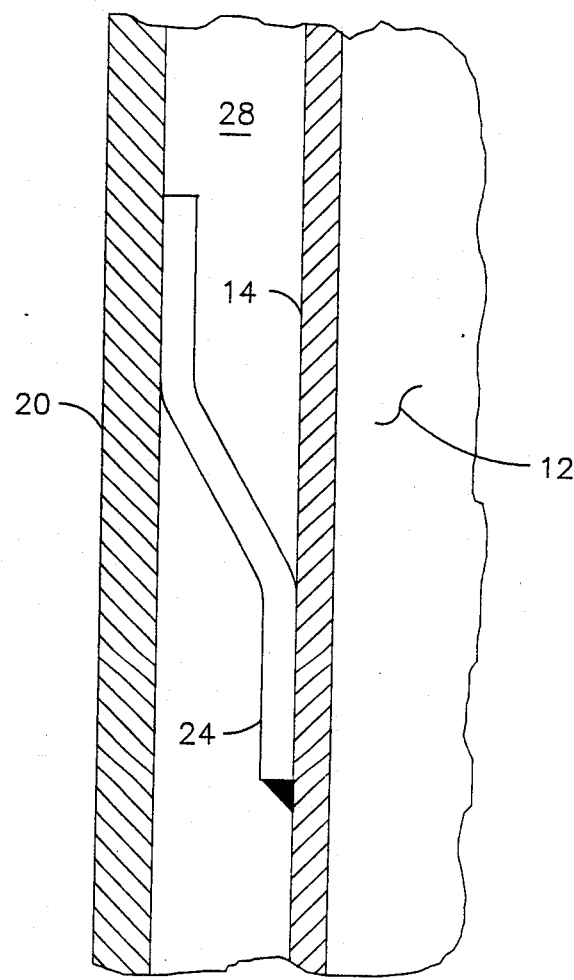
FIG. 2 is an enlarged view of the grout packet showing how it seals between the grouted closure assembly and the inside surface of the jacket leg.
Figure 3:
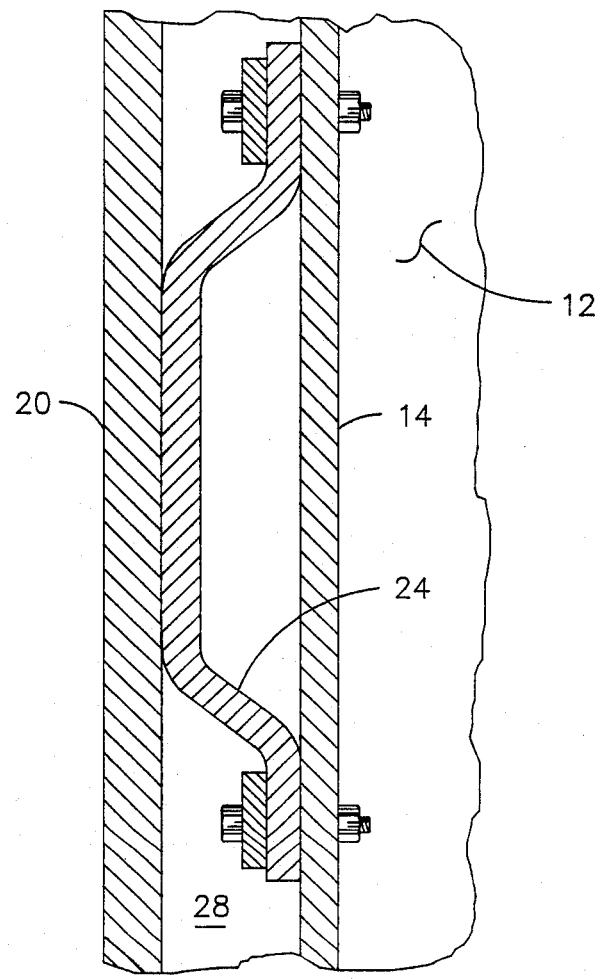
FIG. 3 is an enlarged view of a typical inflatable grout packer.

Adjacent sealed end 16 of cylinder 14 is grout packer or seal 24 which extends around the outer circumference of cylinder 14. FIG. 2 illustrates this arrangement minus the grout in greater detail. Grout packer 24 is usually bent in shape with one end secured, such as by welding, to cylinder 14. The other end extends away from cylinder 14 to bias against and thereby sealably engage the inside surface of jacket leg 20. Grout packer 24 may also be inflatable (see FIG. 3) such that its pressurization will seal against the inside surface of leg 20.

Referring now more particularly to FIG. 1 and more specifically to cylinder 14, openings 26 are shown through which grout or some other sealant is pumped. This grout, which fills annulus 28 between jacket leg 20 and cylinder 14, is retained in place by grout packer 24. Grout is pumped through stringer grout line 30 to main body 12 where it empties into annulus 28 via openings 26. Stringer grout line 30 couples to main body 12 via coupling 32 and it is braced within cylinder 14 by braces 31. Coupling 32 enables grout line 30 to disengage from main body 12 and be removed.

Sealed end 16 of cylinder 14 contains pressure relief valve 34 which is calibrated so that as pressure builds up within leg 20, it is released via valve 34. Yet, should the pressure within cylinder 14 be less than that on the outside, no pressure equalization occurs.

During operation, main body 12 is lowered within jacket leg 20 until the desired elevation is reached. This may be accomplished by using stringer grout line 30 or by using a rope or cable. While being lowered, centralizers 22 and grout packer 24 maintain the alignment of main body 10 within jacket leg 20. Upon being properly positioned, grout packer 24 is either inflated or becomes otherwise biased against the inside surface of leg 20 to effectively seal against the leg and thereby enclose the lower end of annulus 28. Grout is then pumped through grout line 30 and into annulus 28 (generally 1" to 6" in width) until the grout displaces the water and completely surrounds cylinder 14. Grout packer 24 prevents any grout from leaking past sealed end 16 of cylinder 14. After hardening, the grout rigidly secures main body 12 to leg 20 thereby sealing leg 20. When this occurs, leg 20 is deballasted by either pumping the liquid out of the leg or by pressurizing the leg and forcing the liquid out pressure relief valve 34. Upon deballasting, leg 20 acts as a bouyancy tank helping to refloat the offshore structure. As the structure is refloated and the external hydrostatic pressure decreases, pressure relief valve 34 releases the excess pressure occurring within leg 20.

Prior to refloating, grout line 30 can be removed via coupling 32. This and other peripheral equipment related to grouted closure assembly 10, such as grout piping and pumps, can also be removed so as to make the refloating of the structure as easy as possible. No umbilical cord or other equipment is needed to maintain the integrity of grouted closure assembly 10.

Grouted closure assembly 10 can also be used for pile removal (the closure can be used to seal the pile to form a floatation chamber) or for jacket leg reinforcement (prevents the leg from being crushed when a sling is cinched down around it). Assembly 10 is also especially useful when a jacket is cut into multiple sections for removal. This assembly can also be equipped with lifting eyes for ease of handling the cut-up sections.

What is claimed is:

1. A plugging assembly for closing the interior of a tubular member comprising:
    (a) a rigid plug configured to be inserted within a generally cylindrical tube for separating a first area of said tube from a second area of said tube;
    (b) alignment means for concentrically aligning said plug within said tube;
    (c) a passageway extending through said plug and connecting between said first and second areas of said tube;
    (d) a pressure relief mechanism secured to said passageway, said mechanism releasing pressure from within said first area when said pressure exceeds that of said second area, but said mechanism maintaining the pressure differential when said pressure in said first area is less than that of said second area;
    (e) a grout packer secured to said plug and sealing against the inside surface of said tube, said grout packer defining the lower boundary of an annular space between said plug and said tube; and
    (f) sealing means for sealing between said plug and said tube, said sealing means comprising supply means for supplying a sealant into said annular space thereby permanently sealing or plugging said tube.

2. A plugging assembly as set forth in claim 1 wherein said grout packer is inflatable.

3. A plugging assembly as set forth in claim 1 wherein grout is supplied into said annular space by said supply means.

4. A plugging assembly as set forth in claim 3 wherein said supply means comprise a removable pipe coupled to said plug.

5. A plugging assembly as set forth in claim 4 wherein said grout packer is configured as an annular ring surrounding said plug and having a bent portion extending outward and bracing against said tube.

* * * * *